(12) United States Patent
Fieldman

(10) Patent No.: US 12,541,279 B2
(45) Date of Patent: Feb. 3, 2026

(54) SYSTEMS AND METHODS FOR MULTIPLE CONNECTED INTERFACE CONFIGURATIONS

(71) Applicant: CurioXR, Inc., Gainesville, FL (US)

(72) Inventor: Ethan Fieldman, Gainesville, FL (US)

(73) Assignee: CurioXR, Inc., Gainesville, FL (US)

( * ) Notice: Subject to any disclaimer, the term of this patent is extended or adjusted under 35 U.S.C. 154(b) by 0 days.

(21) Appl. No.: 18/761,004

(22) Filed: Jul. 1, 2024

(65) Prior Publication Data

US 2026/0003471 A1    Jan. 1, 2026

(51) Int. Cl.
| G06F 3/0481 | (2022.01) |
| G06F 3/04842 | (2022.01) |
| H04L 51/063 | (2022.01) |
| H04L 51/216 | (2022.01) |

(52) U.S. Cl.
CPC ........ *G06F 3/0481* (2013.01); *G06F 3/04842* (2013.01); *H04L 51/063* (2013.01); *H04L 51/216* (2022.05)

(58) Field of Classification Search
CPC . G06F 3/0481; G06F 3/04842; H04L 51/216; H04L 51/063
See application file for complete search history.

(56) References Cited

U.S. PATENT DOCUMENTS

| 10,999,230 | B2 | 5/2021 | Sachdeva et al. |
| 11,153,235 | B1 * | 10/2021 | Dalonzo ................. H04L 51/42 |
| 11,381,532 | B2 | 7/2022 | Suhail et al. |
| 11,562,312 | B1 | 1/2023 | Fleming et al. |
| 11,570,590 | B1 * | 1/2023 | Cheung ................... H04W 4/14 |
| 11,871,305 | B2 | 1/2024 | Greene et al. |
| 2014/0359480 | A1 * | 12/2014 | Vellal .................... H04L 51/212 |
| | | | 715/752 |
| 2019/0056828 | A1 | 2/2019 | Jitkoff et al. |

OTHER PUBLICATIONS

"Use lists in Slack," https://slack.com/help/articles/27452748828179-Use-lists-in-Slack, accessed on Jun. 27, 2024.
"Triage notifications in the Activity tab," https://slack.com/help/articles/19693583638803-Triage-notifications-in-the-Activity-tab, accessed on Jul. 1, 2024.

* cited by examiner

*Primary Examiner* — Stephen S Hong
*Assistant Examiner* — Darrin Hope
(74) *Attorney, Agent, or Firm* — FINNEGAN, HENERSON, FARABOW, GARRETT & DUNNER, LLP.

(57) ABSTRACT

Aspects of this present disclosure relate to systems and methods for dynamically updating a data structure of a group-based communication system. In one embodiment, a method is disclosed, comprising: detecting a text string with at least one digital indicator designated to automatically trigger generation of at least one removable indicator associated with the text string; generating a first removable indicator and a first graphical removal element within a first graphical user interface; generating a second removable indicator and a second graphical removal element within a second graphical user interface; detecting a single user interaction at the first graphical removal element or the second graphical removal element; and in response to detecting the single user interaction, removing both the first removable indicator from the first graphical user interface and the second removable indicator from the second graphical user interface.

22 Claims, 8 Drawing Sheets

SYSTEMS AND METHODS FOR MULTIPLE CONNECTED INTERFACE CONFIGURATIONS

TECHNICAL FIELD

This disclosure relates generally to group-based communication systems. More particularly, and without limitation, the present disclosure relates to innovations in dynamically updating group-based communication systems. Certain aspects of the present disclosure generally relate to systems and methods for dynamically updating data structures associated with group-based communication channels. Other aspects of the present disclosure generally relate to improvements in systems and methods for dynamically updating multiple connected graphical interfaces that provide particular advantages in group-based communication channels.

BACKGROUND

The inventors here have recognized several problems that may be associated with existing group-based communication systems. In a given group-based communication system, there may be many different communication channels. Each communication channel may accumulate a vast multitude of data (e.g., messages, files, and information) over time, only a subset of which may be important to a particular user. Many systems lack capabilities for automatically organizing and reducing the amount of accumulated data, leading to unnecessary burdening of electronic storage resources, and also creating non-user-friendly difficulties for users to locate, track, or otherwise manage said important data across the different communication channels and amidst data not important to said particular user (but may be important to another user). Moreover, as some of this data is also included in electronic communications, conventional systems overuse bandwidth by included unnecessary accumulations of data. Thus, there is a need for improved systems and methods for dynamically updating group-based communication systems and associated graphical interfaces.

SUMMARY

The present disclosure relates generally to group-based communication systems. More particularly, and without limitation, the present disclosure relates to innovations in dynamically updating one or more data structures of group-based communication systems. For example, certain aspects of the present disclosure relate to dynamically updating a database of a group-based communication system in response to detected interactions or conditions. Further, certain embodiments may update one or more graphical interfaces based on the updates to the database.

One aspect of the present disclosure comprises a system for dynamically updating a data structure, comprising: at least one processor and at least one non-transitory computer-readable medium storing instructions that, when executed by the at least one processor, cause the at least one processor to perform operations comprising: detecting, within a group communication channel represented within a first graphical user interface, a text string with at least one digital indicator designated to automatically trigger generation of at least one removable indicator associated with the text string; generating, in response to the detecting of the at least one digital indicator, a first removable indicator within the first graphical user interface, wherein the first graphical user interface includes a first graphical removal element associated with the first removable indicator; generating, in response to the detecting of the at least one digital indicator, a second removable indicator within a second graphical user interface, wherein the second graphical user interface includes a second graphical removal element associated with the second removable indicator; detecting a single user interaction at the first graphical removal element or at the second graphical removal element, the single user interaction comprising at least one of a clicking action or a touch action; and in response to detecting the single user interaction, removing both the first removable indicator from the first graphical user interface and the second removable indicator from the second graphical user interface.

Another aspect of the present disclosure comprises a computer-implemented method for dynamically updating a data structure, comprising: detecting, within a group communication channel represented within a first graphical user interface, a text string with at least one digital indicator designated to automatically trigger generation of at least one removable indicator associated with the text string; generating, in response to the detecting of the at least one digital indicator, a first removable indicator within the first graphical user interface, wherein the first graphical user interface includes a first graphical removal element associated with the first removable indicator; generating, in response to the detecting of the at least one digital indicator, a second removable indicator within a second graphical user interface, wherein the second graphical user interface includes a second graphical removal element associated with the second removable indicator; detecting a single user interaction at the first graphical removal element or at the second graphical removal element, the single user interaction comprising at least one of a clicking action or a touch action; and in response to detecting the single user interaction, removing both the first removable indicator from the first graphical user interface and the second removable indicator from the second graphical user interface.

Yet another aspect of the present disclosure comprises a non-transitory computer-readable medium storing instructions that, when executed by the at least one processor, cause the at least one processor to perform operations comprising: detecting, within a group communication channel represented within a first graphical user interface, a text string with at least one digital indicator designated to automatically trigger generation of at least one removable indicator associated with the text string; generating, in response to the detecting of the at least one digital indicator, a first removable indicator within the first graphical user interface, wherein the first graphical user interface includes a first graphical removal element associated with the first removable indicator; generating, in response to the detecting of the at least one digital indicator, a second removable indicator within a second graphical user interface, wherein the second graphical user interface includes a second graphical removal element associated with the second removable indicator; detecting a single user interaction at the first graphical removal element or at the second graphical removal element, the single user interaction comprising at least one of a clicking action or a touch action; and in response to detecting the single user interaction, removing both the first removable indicator from the first graphical user interface and the second removable indicator from the second graphical user interface.

DETAILED DESCRIPTION

The present disclosure addresses systems and methods for use in group-based communication systems. Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 1:
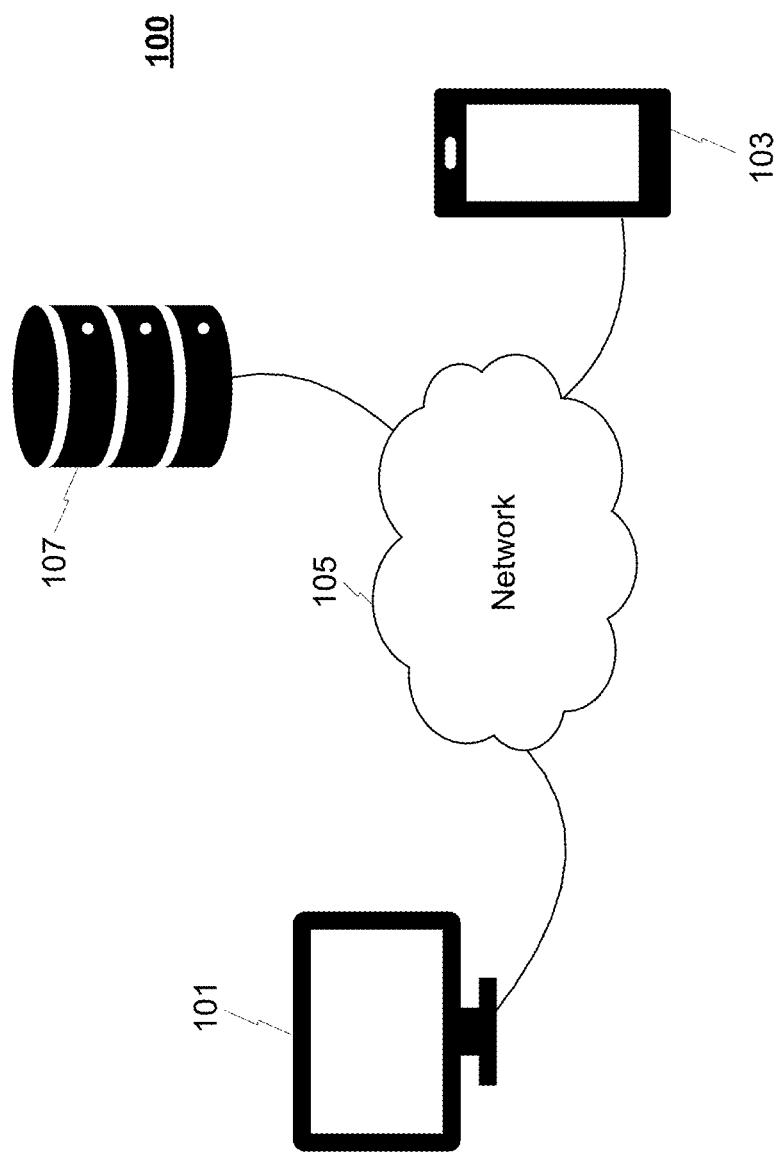
FIG. 1 shows an exemplary group-based communication system, consistent with disclosed embodiments.

FIG. 1 is an exemplary group-based communication system 100, consistent with disclosed embodiments. System 100 comprises user device 101, mobile device 103, network 105, and server 107. One of ordinary skill will understand that particular devices in system 100 can be duplicated, omitted, or modified, as appropriate. For example, there may be any number (e.g., 0, 1, 5, 100, etc.) of user devices 101 and mobile devices 103. The exemplary components and arrangements as shown in FIG. 1 are not intended to limit the disclosed embodiments.

In some embodiments, each device illustrated in FIG. 1 may be operated by separate parties. However, in other embodiments, one party may operate or administer more than one of the devices illustrated in FIG. 1. For example, a single entity may operate any or all of user device 101, network 105, and server 107.

In some embodiments, system 100 may comprise one or more user devices 101. User device 101 may represent a computing device configured to perform one or more processes consistent with the disclosed embodiments. For example, user device 101 may include a notebook computer, a desktop computer, tablet computer, or the like. In some embodiments, user device 101 may include a visual display, such as a screen, touchscreen, monitor, or the like, that may display information to the user. For example, user device 101 may display one or more graphical user interfaces (GUIs) of a group-based communication platform (e.g., FIGS. 2A and 4B).

In some embodiments, system 100 may comprise one or more mobile devices 103. Mobile device 103 may represent a mobile device with computing ability, a smartphone, a tablet, or the like. Mobile device 103 may include a visual display, such as a screen, monitor, touchscreen, or the like, that may display information to the user. For example, mobile device 103 may display one or more graphical user interfaces (GUIs) of a group-based communication platform (e.g., any of FIGS. 2A-4B).

Generally, it may be understood that user device 101 and mobile device 103 may be devices configured to perform similar functions, operations, or processes, and system 100 may include any number of user devices 101 and mobile devices 103 that may be operated by the same or different entities. For example, user device 101 and/or mobile device 103 may be configured to perform operations including accessing, displaying, or otherwise interacting with a group-based communication platform that may, for example, be hosted by server 107, as described and exemplified below.

In some embodiments, network 105 may comprise an electronic network for transmitting data between electronic devices. For example, network 105 may be facilitate between a plurality of devices in system 100 (as well as other, unpictured devices). In some embodiments, network 105 may be implemented as one or more of the Internet, an intranet, a private link (such as a fiber optic network connecting remote sites), a mobile network, a satellite network, or the like. In some embodiments, network 105 may comprise wired links, wireless links, or a combination of wired and wireless links between the devices in system 100 (as well as other, unpictured devices).

Generally, it may be understood that any of the devices illustrated in FIG. 1 may communicate with any other device illustrated in FIG. 1 using a wireless network, mobile network, a satellite network, a physical data line, or the like. In operation, at least one user device 101, at least one mobile device 103, at least one server 107, or any combination thereof, may execute computer instructions (e.g., program codes) and may perform functions in accordance with techniques described herein. Computer instructions may include routines, programs, objects, components, data structures, procedures, modules, and functions, which may perform particular processes described herein. In some embodiments, such instructions may be stored in user device 101, mobile device 103, server 107, and/or elsewhere.

In some embodiments, server 107 may comprise one or more electronic devices configured to perform one or more tasks, processes, operations, and/or functions. Server 107 may include one or more known processing devices, such as, for example, a microprocessor. In some embodiments, server 107 may include any type of single- or multi-core processor, mobile device microcontroller, central processing unit, or any other circuitry configured to perform logic operations. In operation, server 107 may execute computer instructions (e.g., program codes) and may perform functions in accordance with techniques described herein. Computer instructions may include routines, programs, objects, components, data structures, procedures, modules, and functions, which may perform particular processes described herein. For example, server 107 may be configured to update digital information that it stores or has access to (e.g., interface information, text data, etc.), transmit digital information to another device (e.g., at least one user device 101 and/or at least one mobile device 103), and/or cause another device to change displayed information. In some embodiments, such instructions may be stored in server 107, or elsewhere.

In some embodiments, server 107 may be configured to host a group-based communication platform. A group-based communication platform may refer to a digital tool designed to facilitate electronic communication among groups of devices. For example, a group-based communication platform may be configured to facilitate communication between one or more users with each other via one or more user devices (e.g., user device 101) and/or mobile devices (e.g., mobile device 103). In some embodiments, a group-based communication platform may comprise one or more communication channels. A communication channel or group communication channel may refer to an information route or medium configured to facilitate the exchange of data (e.g., messages, files) between and among systems. Further, a communication channel may be accessible or open to all users of the group-based communication platform (e.g., public) or only a specific subset of users (e.g., private). In some embodiments, a communication channel may comprise one or more communication threads. A communication thread may refer to a subdivision of a communication channel that is similarly configured to facilitate the exchange of data between and among systems. Additionally or alternatively, a communication thread may refer to a message in a group communication channel and all subsequent replies to said message (e.g., communication thread 310 depicted in FIGS. 3A-3B). In some embodiments, a communication channel or group communication channel may be generated, hosted, run, connected, streamed, or otherwise facilitated by an application, which may include an application program interface (API).

In some embodiments, the group communication channel is configured to receive input from any one of a plurality of authorized user accounts. For example, a private group communication channel may be configured to be accessible only by a subset of authorized user accounts of the set of user accounts of the associated group-based communication platform. In such cases, the group communication channel may be configured to receive inputs (e.g., messages, files) from any of the authorized user accounts. Additionally or alternatively, in some embodiments, any combination of the first removable indicator, the first graphical removal element, the second removable indicator, and/or the second graphical removal element may be viewable to a particular one of the authorized user accounts and not any other authorized user account. For example, the removable indicators and graphical removal elements associated with a particular user account will be viewable by only that particular user account and not any other user accounts.

In some embodiments, server 107 may comprise one or more databases. A database may refer to one or more devices configured to store data. For example, a database may refer to an electronic filing system that stores data in a structured way. By way of non-limiting example, a database may include relational databases, NoSQL databases, graph databases, in-memory databases, or the like.

In some embodiments, the one or more databases may be configured to store one or more data structures each associated with one or more users of system 100. For example, the one or more databases may comprise a number of data structures (e.g., equal to the number of users of system 100). In some embodiments, the data structures may comprise data, including a removable indicator, to be displayed to a device of a particular user via a plurality of GUIs. For example, a data structure may comprise a list of marked items for a particular user. In some embodiments, server 107 may be configured to dynamically manage and update the one or more data structures, as exemplified and described below. Data related to GUIs, which may be configured to cause display of particular information in a particular manner, may be stored at one or more user devices 101, one or more mobile devices 103, one or more servers 107, or any combination thereof, and may include, for example, Hyper-Text Markup Language (HTML) data, API data, or web browser data.

In some embodiments, the group-based communication platform may comprise a plurality of GUIs. For example, the group-based communication platform may comprise a first GUI and a second GUI. The first GUI may display a communication channel and all communication threads of the communication channel (e.g., as depicted in FIGS. 2 and 3). The second GUI may display the digital information stored in the one or more databases (e.g., as depicted in FIGS. 4A-4B). For example, the second GUI may only display the digital information associated with the user (e.g., a user account, an authenticated user, etc.) of the user device or mobile device. In some embodiments, the second GUI may display information based on information from one or more communication channels (e.g., which may be associated with respective GUIs).

In some embodiments, at least one processor may be configured to monitor the group-based communication platform. Monitoring the group-based communication platform may include detecting, within a group communication channel represented within a first graphical user interface (e.g., part of a group communication channel), a text string with at least one digital indicator designated to automatically trigger the generation of at least one removable indicator. For example, server 107 may be configured to monitor the messages (e.g., text-based message, shared files) in the group-based communication channel and detect if any message comprises at least one digital indicator. Detecting if any message comprises at least one digital indicator may include comparing text strings within the group communication channel to one or more predetermined reference text strings to determine a match (e.g., exact character-for-character match, character match within a threshold tolerance amount).

In some embodiments, the at least one digital indicator may include a particular text string in the group communication channel. The particular text string may include at least one of: an identifier associated with a particular user (or device), a predefined graphical icon, or a digital flag. A particular user may refer to a specific user of the group-based communication system with a user identifier and for whom a tailored database or data structure is dedicated. For example, a particular user may be a user for which server 107 generates, maintains, and updates a marked items list, GUI, thread, channel, or other digital information via a dedicated database or data structure. In some embodiments, the at least one digital indicator comprises at least one of an HTML element or API call information.

In some embodiments, the particular text string may include a user identifier or tag (e.g., @user) or a group identifier or tag (e.g., @user-group) associated with a particular user. For example, each user in a group communication channel (and/or communication thread) may have an associated unique user identifier (e.g., user Jim Young is associated with user identifier @Jim Young). Further, a single group identifier may be associated with one or more users in a group communication channel (e.g., group identifier @ Wall-Team may be associated with users John Wall and Paul Wall). In some embodiment, at least one processor may be configured to set a digital flag (e.g., associated with a particular user account) to active after detecting a message including a user identifier or group identifier associated with a particular user (e.g., associated with the same particular user account). For example, server 107 may be configured to set a digital flag associated with a message to active based on (e.g., in response to, using information derived from) detecting a message sent by a particular user including a user identifier or group identifier associated with said user. Additionally or alternatively, at least one processor may be configured to set a digital flag to active after detecting a message including a user identifier or group identifier associated with a particular user only if the message is sent by a predefined set of users. For example, server 107 may be configured to set a digital flag associated with a message to active based on (e.g., in response to, using information derived from) detecting that the message includes a user identifier or group identifier associated with a particular user (e.g., @User1) and was sent by a predefined set of users (e.g., only @User1; any user associated with group identifier @Team1; only @User1 and @User2). A digital flag may include an HTML element, an API element, a data structure element, or any other electronic marker configured to cause, at least under certain conditions, the generation of digital GUI content. For example, a digital flag, when set, may cause an application (e.g., streaming a communication channel or thread) to generate removable indicators based on received messages (e.g., any received message, only messages with a digital indicator).

Further, the predefined graphical icon may be a particular reaction or emotion response to a message (e.g., thumbs-up emoji). Further, the digital flag may be an indication (e.g., to server 107, to an application associated with a communication channel or thread, and/or to a device associated with the first GUI) that the text string should trigger the generation of at least one removable indicator. In some embodiments, the digital flag may be set to active in response to a setting interaction within the first graphical interface. For example, a user may, via a user device interact with (e.g., click, tap, touch, drag, swipe, press) an interactable graphical icon (e.g., slider, switch, checkmark icon) associated with a message or thread to set a digital flag such that server 107 may automatically generate a removable task indicator. In some embodiments, each digital indicator may be defined in a memory of a device in the group-based communication system. In some embodiments, the particular digital flag may be defined by a user (e.g., by a user device 101 and/or a mobile device 103) and/or server 107. For example, a user may interact with (e.g., touch, click on) one or more GUIs at a user device 101 and/or a mobile device 103 and the interactions may cause the generation of a user-specified group of digital flags (e.g., which may be stored at any device of communication system 100) that will trigger automatic performance of an electronic operation, consistent with disclosed embodiments. Additionally or alternatively, an administrative user may define which inputs, such as text strings or graphical icons (e.g., emoticons, emojis), are digital indicators and store the definition in a memory of server 107. In some embodiments, at least one processor may be configured to set the digital flag to active based on a detected particular text string. For example, server 107 may be configured to, based on (e.g., in response to, using information derived from) detecting a user identifier (e.g., @JohnY) or a group identifier associated with a particular user, set a digital flag associated with the message comprising the user identifier or group identifier (e.g., and/or associated communication channel or thread) to active.

In some embodiments, the digital indicator may be designated (e.g., configured) to automatically trigger the generation of at least one removable indicator. For example, server 107 may be configured to generate, based on (e.g., in response to, using information derived from) detecting at least one digital indicator, a first removable indicator in a first graphical interface and a second removable indicator in a second graphical interface. A removable indicator may refer to any graphical representation based on a message with at least one digital indicator. For example, a removable indicator may include the message and any highlighting, bolding, marking, any combination of the foregoing, or any other means of graphically distinguishing the message with at least one digital indicator from a message without any digital indicators. Additionally or alternatively, a removable indicator may include any graphical representation designed to indicate a message is designated as a task and is viewable as a task in a first GUI and a second GUI. Additionally or alternatively, a removable indicator may include a text string based on (e.g., a summary of, including a portion of) a text string in a communication channel (and/or communication thread). In some embodiments, at least one processor may be configured to update, based on (e.g., in response to, using information derived from) detecting at least one digital indicator, a database or data structure associated with the particular user. For example, server 107 may be configured to update, based on (e.g., in response to, using information derived from) detecting at least one digital indicator, a database or data structure associated with the particular user to include the message including the at least one digital indicator.

In some embodiments, at least one processor may be configured to generate a removable indicator only in response to at least one criterion, which may be part of a predefined set of one or more criteria. For example, server 107 may be configured to generate a removable indicator only based on (e.g., in response to, using information derived from) detecting the at least one digital indicator or detecting a predefined user interaction. Further, the predefined user interactions may include a user interaction with a particular interactable graphical element (e.g., follow button, add button).

In some embodiments, a removable indicator may be associated with (e.g., include, be digitally and/or graphically linked with) a graphical removal element. A graphical removal element may refer to any interactable graphical representation designed to indicate a message is designated as a task. For example, a graphical removal element may include a checkmark icon, a task icon, a "DONE" button, or any other interactable graphical element that is designed to indicate a message is designated as a pending task and/or that can be interacted with by a user to generate an effect.

In some embodiments, at least one processor may be configured to detect a single user interaction at a graphical removal element. A single user interaction may include, for example, one clicking action or touch action. For example, server 107 may be configured to automatically remove (e.g., simultaneously or near simultaneously), based on (e.g., in response to, using information derived from) detecting a user clicking at a first graphical removal element in a first GUI or a second graphical removal element in a second GUI, both the first removable indicator from the first GUI and the second removable indicator from the second GUI. In some embodiments, at least one processor may be configured to automatically remove both the first removable indicator from the first GUI and the second removable indicator from the second GUI without transitioning between GUIs. For example, server 107 may be configured to automatically remove, based on detecting a user tapping a first graphical removal element in a first GUI, the second removable indicator from the second GUI, without displaying the second GUI. This improvement to user interfaces, including how to display certain information (and not other information) increases the efficiency of using display devices, especially those with limited display sizes (e.g., mobile devices). It also may more efficiently reduce amounts of data to store or transmit, thus freeing up resources such as memory and bandwidth for other uses.

In some embodiments, a removable indicator may be removable only in response to a user interaction at an associated graphical removal element. For example, a first removable indicator in a first GUI and a second removable indicator in a second GUI are only removable by server 107 based on (e.g., in response to, using information derived from) detecting a user interaction at a corresponding first graphical removal element in the first GUI or a corresponding second graphical removal element in the second GUI.

In some embodiments, at least one processor may be configured to monitor a communication channel and the associated communication threads and accordingly update a database or data structure with any messages containing at least one digital indicator. Additionally or alternatively, in some embodiments, at least one processor may be configured to monitor the particular user's direct messages. For example, server 107 may be configured to add every message a particular user (or device) transmits and/or receives to the database or data structure associated with that particular user. Additionally or alternatively, in some embodiments, at least one processor may be configured to monitor a particular communication thread.

In some embodiments, server 107 may be configured to host a plurality of different communication channels and maintain a single database or data structure for each particular user across all communication channels to which the user is a member. For example, server 107 may combine each item added from a first communication channel, a second communication channel, and a third communication channel to a single database or data structure for a particular user, creating an aggregate marked items list.

In some embodiments, at least one processor may be configured to not update a graphical interface (e.g., the second GUI) or a database based on actions performed by a user other than a particular user. For example, if a user other than the particular user performs a reaction interaction (e.g., interacts by adding an emoji or emoticon) with a message with at least one digital indicator, server 107 may not update automatically the second GUI and/or the database associated with the particular user based on (e.g., in response to, using information derived from) detecting said reaction interaction. Additionally or alternatively, the at least one processor may be configured to not update a particular graphical interface or a database based on actions that are not part of a predefined set of one or more criteria, consistent with disclosed embodiments. For example, the at least one processor may be configured to not update the second GUI based on (e.g., in response to) a viewing action (e.g., a particular user account viewing a message and/or communication channel or thread), a new message without a digital indicator, or a reaction interaction. Additionally or alternatively, in some embodiments, at least one processor may be configured to only remove a removable indicator or an associated graphical removal element from a graphical interface of a particular user based on a detected interaction performed by a particular user. For example, server 107 may be configured to only remove a first removable indicator and an associated first graphical removal element in a first GUI and/or a second removable indicator and an associated second graphical removal element in a second GUI based on (e.g., in response to, using information derived from) a detected single user interaction at either the first graphical removal element or the second graphical removal element by the particular user and not, for example, by any other user.

FIGS. 2A-4B are exemplary GUIs of a group-based communication system, consistent with disclosed embodiments. For example, the group-based communication system may be the same as group-based communication system 100 depicted in FIG. 1. FIGS. 2A-4B depict exemplary GUIs as viewed from the perspective of a user device or mobile device associated with the user account "User." However, it may be understood that the implementation of the operations and processes described herein may be similarly applied to a user device or mobile device associated with user account "User 2" or any other user account, resulting in a same or a differing set of messages having removable indicators and graphical removal elements and viewable in the second GUI.

Figure 2A:
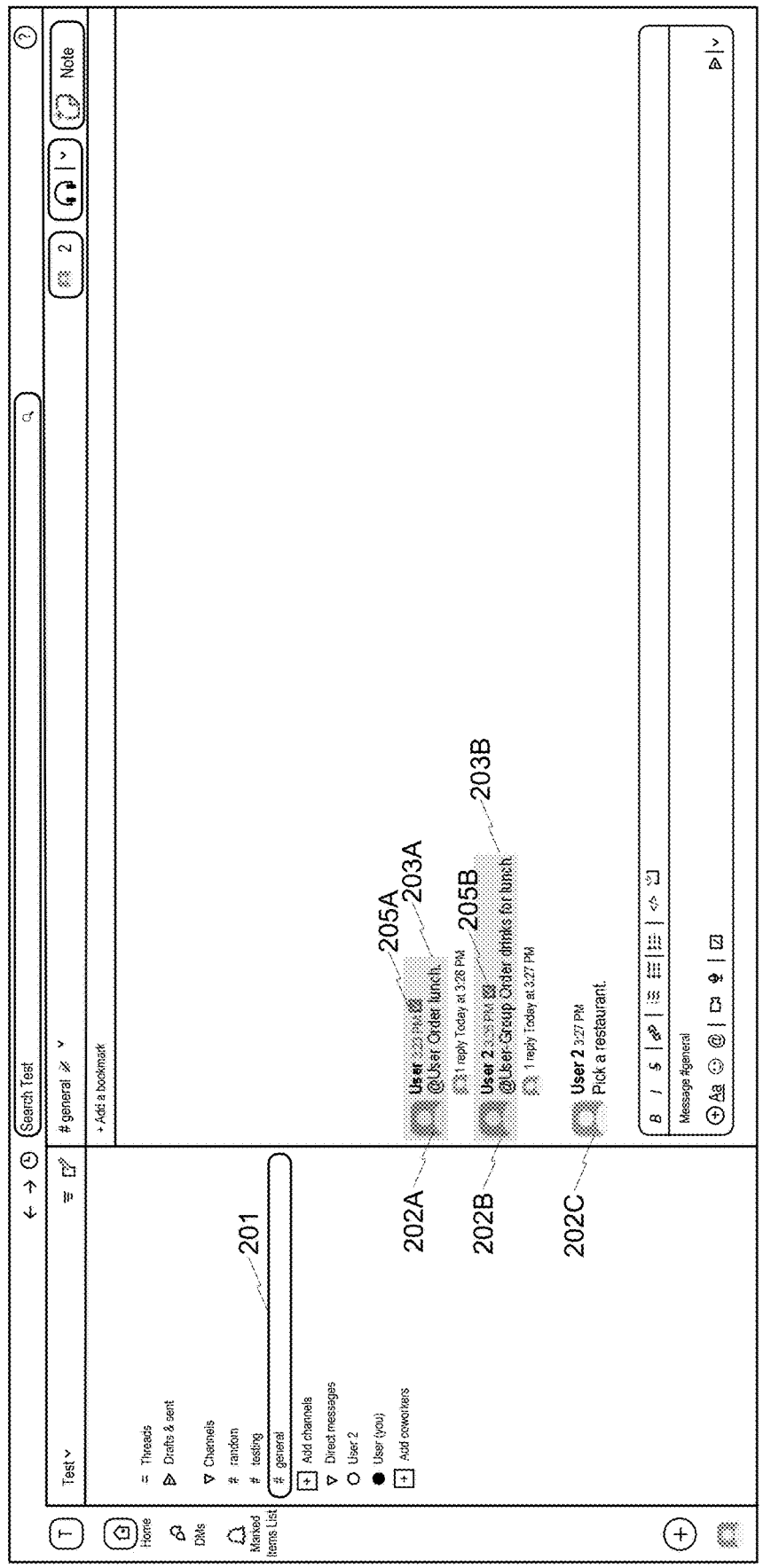
FIGS. 2A and 2B shows an exemplary graphical user interface of a group-based communication system, consistent with disclosed embodiments.
Figure 2B:
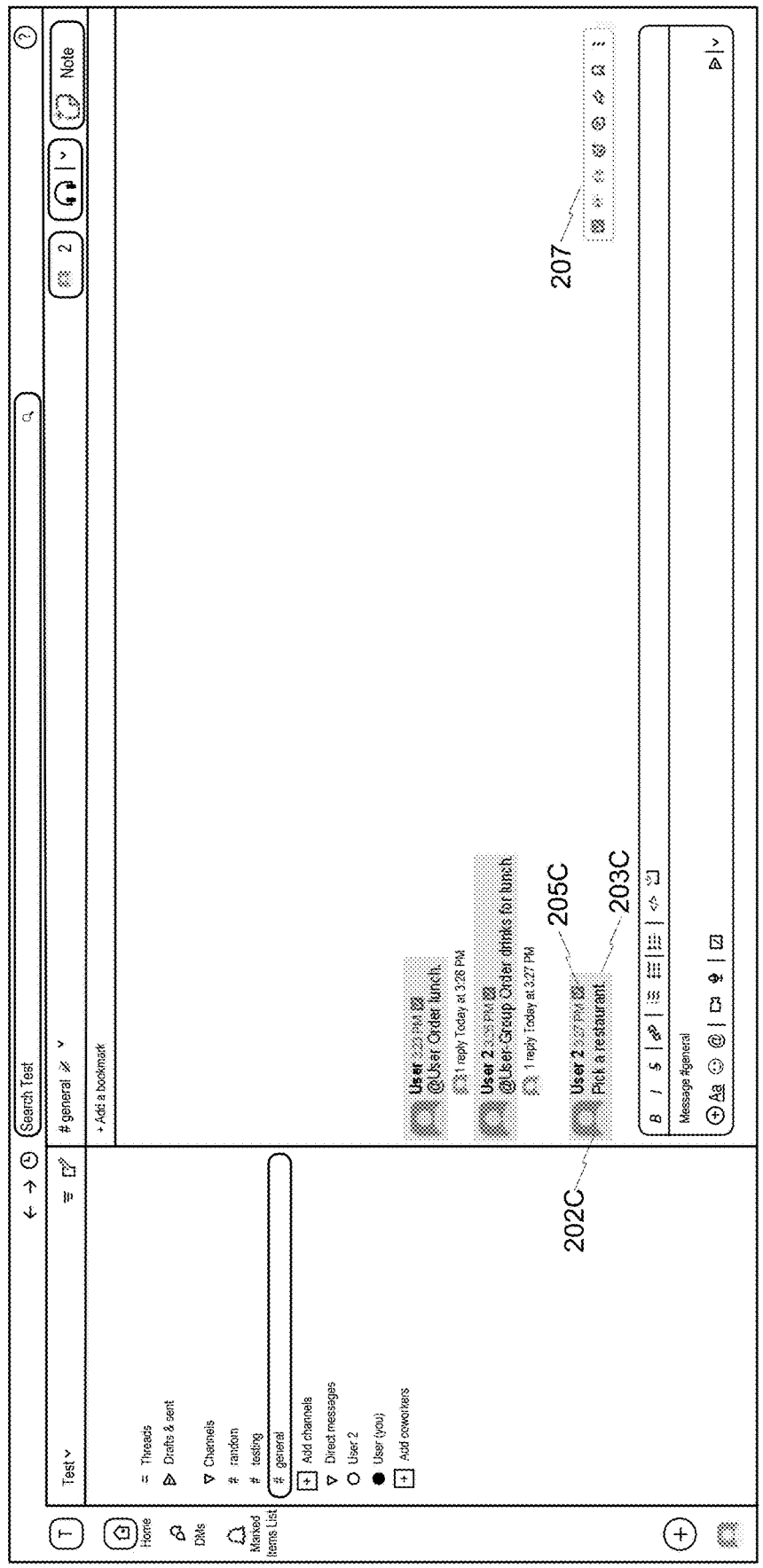

FIGS. 2A-2B show an exemplary first GUI 200A, 200B of a group-based communication system that displays a communication channel 201, consistent with disclosed embodiments. First GUI 200A includes a communication channel 201; messages 202A, 202B, and 202C; emphases 203A and 203B; and graphical removal elements 205A and 205B. In some embodiments, a removable indicator may comprise a message with at least one digital indicator with a graphical emphasis. For example, a first removable indicator may comprise message 202A with emphasis 203A. In other embodiments, a removable indicator may comprise only a message with at least one digital indicator without any emphasis.

As depicted in FIG. 2A, message 202A contains a particular text string including an identifier associated with User (i.e., "@User"). Server 107 may be configured to automatically generate, based on (e.g., in response to, using information derived from) detecting that message 202A contains the identifier associated with User, a first removable indicator (message 202A and emphasis 203A) and a first graphical removal element 205A in first GUI 200A and a second removable indicator and a second graphical removal element in a second GUI (e.g., second GUI 400 as depicted in FIGS. 4A-4B). Further, server 107 may update a database or data structure associated with the user to include message 202A.

Further, as depicted in FIG. 2A, message 202B contains a particular text string including a group identifier associate with User (i.e., "@User-Group"). Server 107 may be configured to automatically generate, based on (e.g., in response to, using information derived from) detecting that message 202B contains the group identifier associated with User, a first removable indicator (message 202B and emphasis 203B) and a first graphical removal element 205B in first GUI 200A and a second removable indicator and a second graphical removal element in a second GUI (e.g., second GUI 400 as depicted in FIGS. 4A-4B). Further, server 107 may update a database or data structure associated with the user to include message 202B.

Further, as depicted in FIG. 2A, message 202C contains no digital indicator. Therefore, server 107 does not automatically generate anything associated with message 202C.

In FIG. 2B, first GUI 200B further includes a set of interactions 207. Server 107 may be configured to automatically generate, based on (e.g., in response to, using information derived from) detecting a setting interaction (e.g., clicking action, touching action) at a graphical icon of set of interactions 207 designated to set a digital flag associated with a message 202C to active, a first removable indicator (message 202C and emphasis 203C) and a first graphical removal element 205C in first GUI 200B and a second removable indicator and a second graphical removal element in a second GUI (e.g., second GUI 400 as depicted in FIGS. 4A-4B). Further, server 107 may update a database or data structure associated with the user to include message 202C.

Figure 3A:
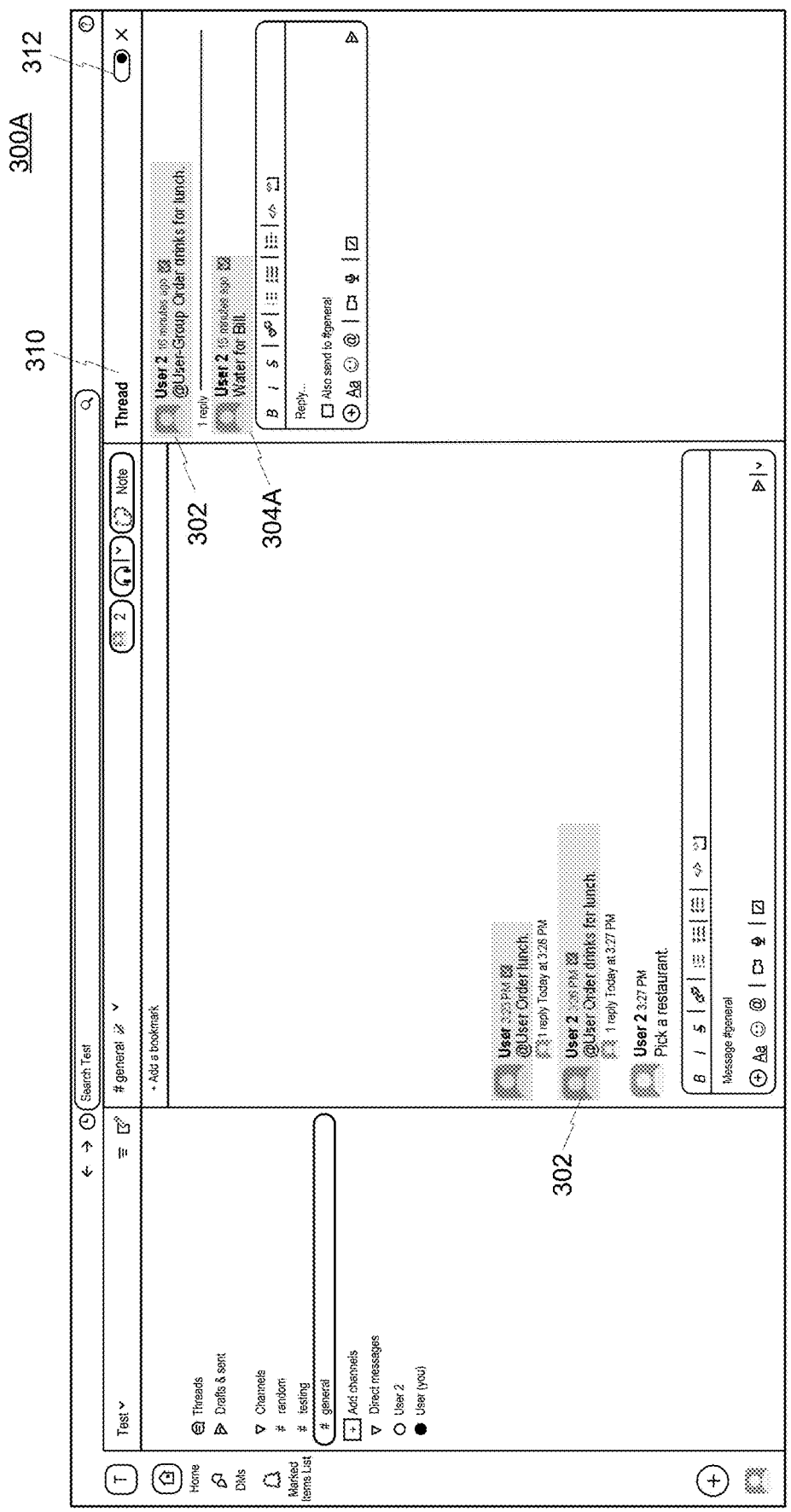
FIGS. 3A and 3B show an exemplary graphical user interface of a group-based communication system, consistent with disclosed embodiments.
Figure 3B:
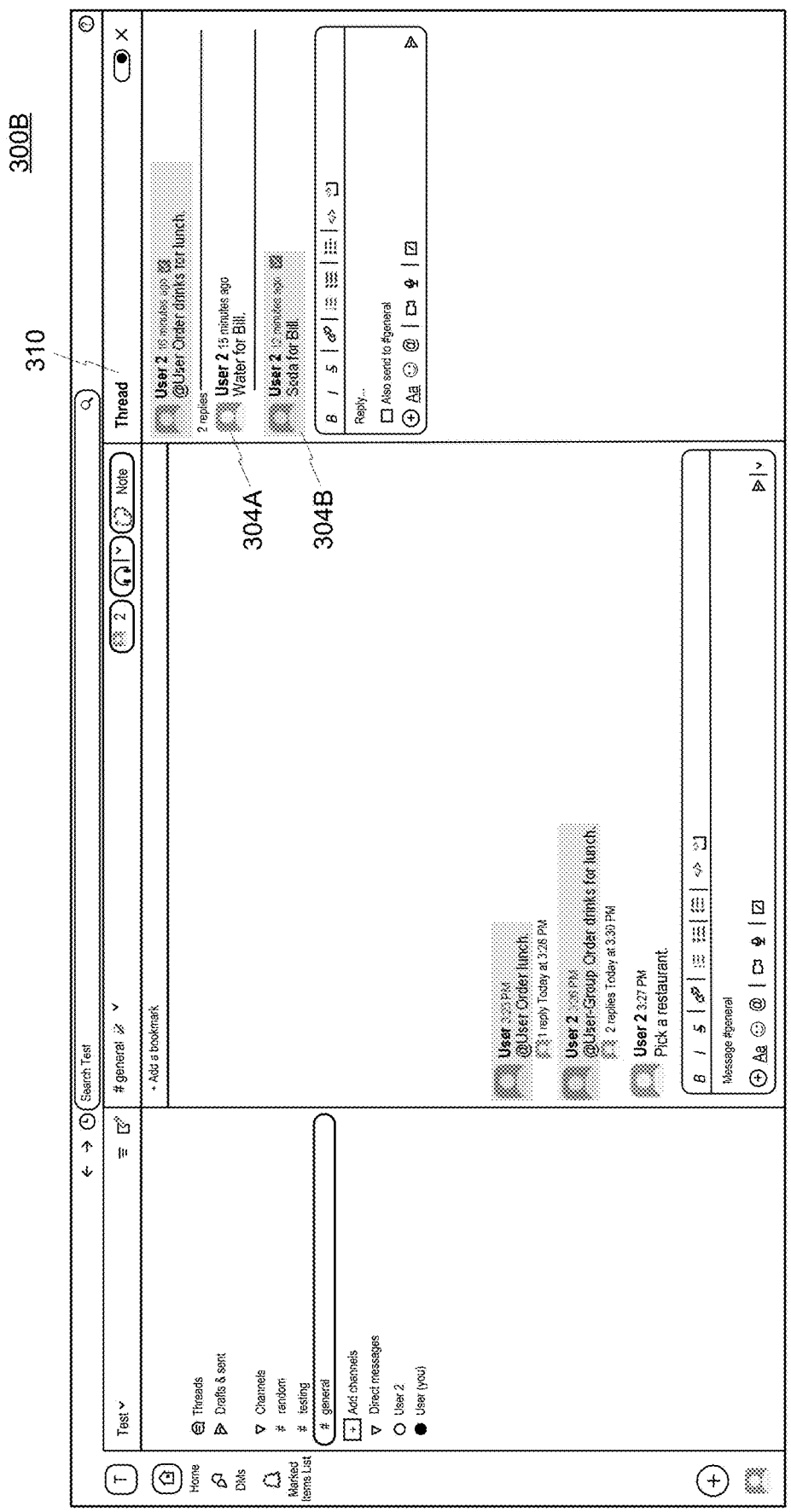
Figure 4A:
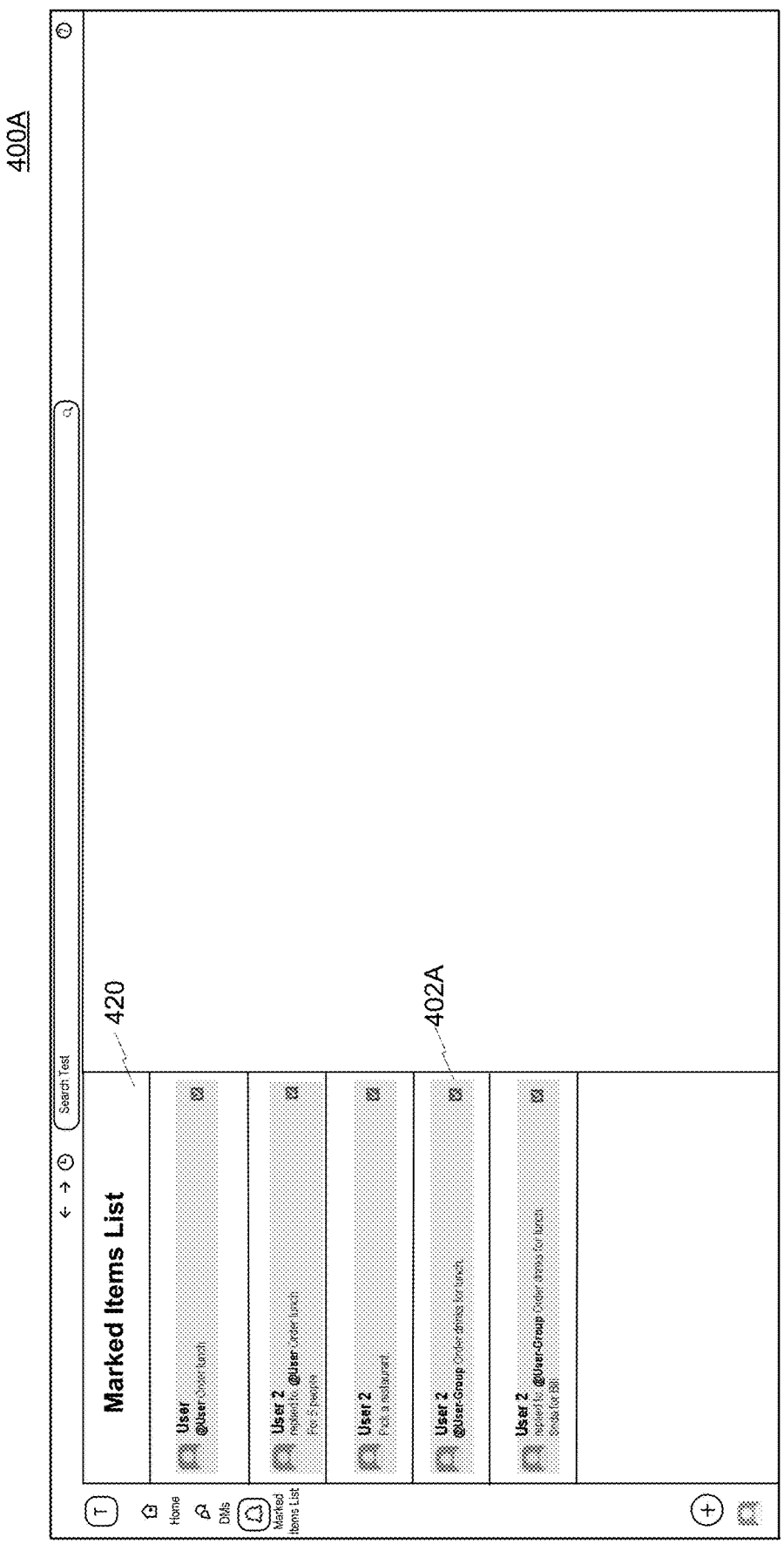
FIGS. 4A and 4B show another exemplary graphical user interface of a group-based communication system, consistent with disclosed embodiments.
Figure 4B:
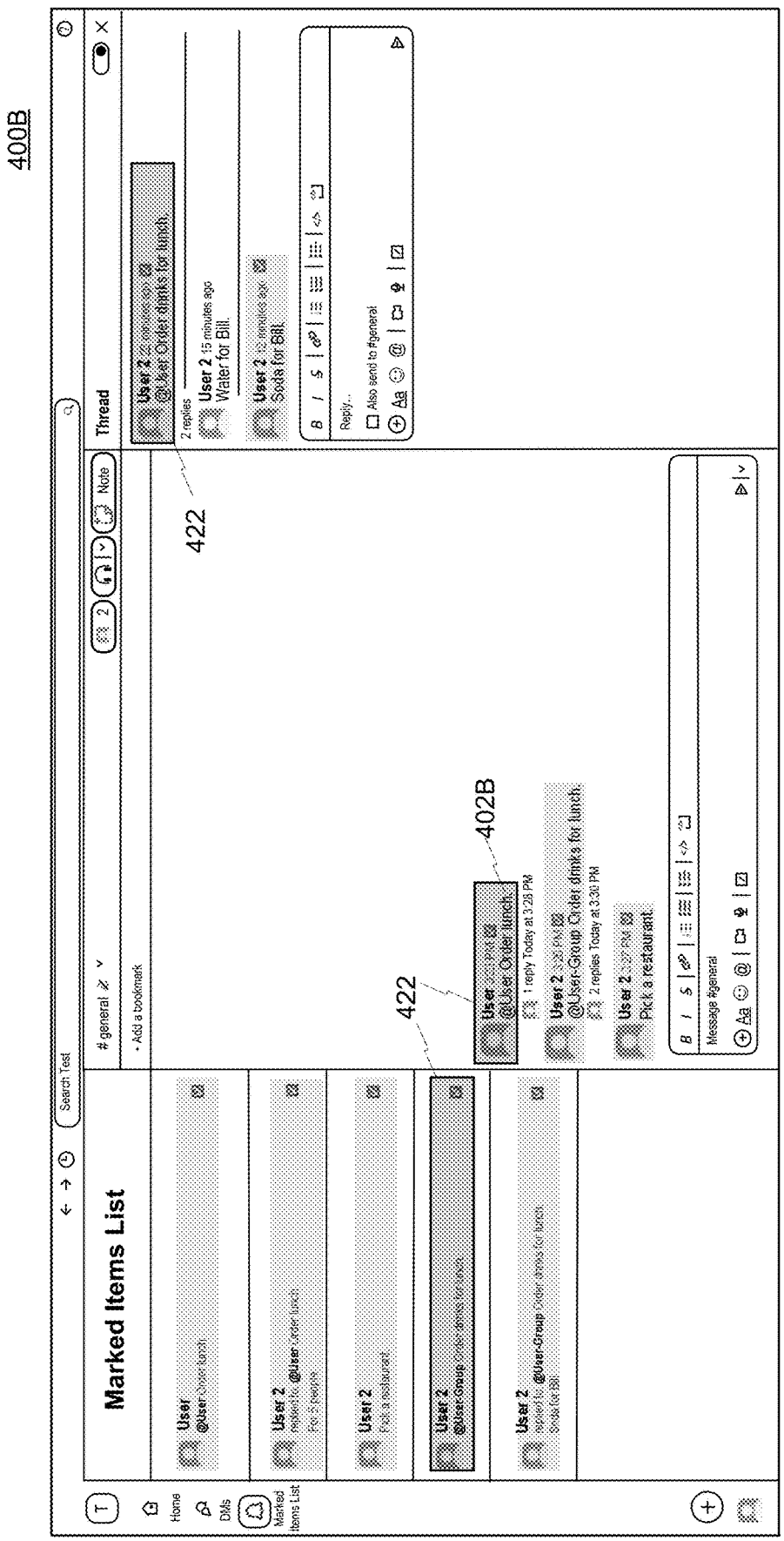

FIGS. 3A-3B are an exemplary first GUI 300A of a group-based communication system, consistent with disclosed embodiments. As depicted in FIG. 3A, first GUI 300A may include communication channel 301, communication thread 310, toggle 312, message 302, and reply 304A. In some embodiments, server 107 may be configured to display, based on (e.g., in response to, using information derived from) detecting a single interaction at a message with at least one reply message (e.g., message 302 with reply 304A), communication thread 310 in the first GUI. In some embodiments, server 107 may display any combination or positioning of the communication channel (e.g., communication channel 301) and the communication thread (e.g., communication thread 310) in the first GUI.

In some embodiments, communication thread 310 may comprise the associated message and all subsequent replies to said message. Further, communication thread 310 may comprise a toggle. Toggle may refer to any interactable graphical icon that, in response to server 107 detecting a single user interaction at said interactable graphical icon, may toggle a digital flag associated with the entire thread between active or inactive. As depicted in FIG. 3A and in some embodiments, server 107 may be configured to automatically set toggle 312 to active based on (e.g., in response to, using information derived from) determining that a message of the communication thread includes at least one digital indicator. Additionally or alternatively, server 107 may be configured to only change the status of the toggle and the associated digital flag based on (e.g., in response to, using information derived from) a single user interaction at the toggle. The status of the digital flag of each message in a communication channel and associated with a particular user may be stored in a memory (e.g., database of server 107).

In some embodiments, at least one processor may be configured to set a digital flag associated with a particular group communication channel to active in response to a setting interaction within a first GUI by a particular one of the authorized user accounts. For example, a user authorized to access a group communication channel or communication thread may perform a setting interaction (e.g., interact with a toggle), and server 107 may, based on (e.g., in response to, using information derived from) detecting the setting interaction, set or update the digital flag associated with said group communication channel or communication thread to active.

Additionally or alternatively, in some embodiments, at least one processor may be configured to set a digital flag associated with a particular group communication channel to inactive in response to a deactivation interaction within a first GUI by a particular one of the authorized user accounts. A deactivation interaction may include any input that causes the setting or updating of the digital flag to inactive (e.g., inoperable), such as an input received or generated based on an interaction with a GUI. For example, a user authorized to access a group communication channel or communication thread may perform a deactivation interaction (e.g., interact with a toggle), and server 107 may, based on (e.g., in response to, using information derived from) detecting the deactivation interaction, set or update the digital flag associated with said group communication channel or communication thread to inactive. It is appreciated that the digital flag may be set by a setting action that is different from the deactivation interaction. For example, the digital flag may be set in response to detecting a message that includes a particular user identifier or group identifier, but may be deactivated by an interaction with a toggle. It is also appreciated that, in some embodiments, the digital flag may be set by a plurality of user accounts (e.g., user accounts authorized to access a communication channel), but may be only deactivated by one single user account.

As depicted in FIG. 3A, server 107 has automatically generated a removable indicator and a graphical removal element for reply 304A based on (e.g., in response to, using information derived from) determining that reply 304 is a reply to a message including at least one digital indicator. In some embodiments, server 107 may only generate a removable indicator and a graphical removal element for a reply after determining that the digital flag has been set to active by the user. For example, after receiving a setting interaction at the toggle and setting the digital flag associated with the communication thread to active, server 107 may begin automatically generating removable indicators and graphical removal elements for replies sent in the thread, regardless if the reply contains a user indicator or user group indicator. Further, server 107 may automatically update a database or data structure associated with the user to include reply 304A.

As depicted in FIG. 3B, communication thread 310 further comprises reply 304B. In some embodiments, server 107 may be configured to generate removable indicators and graphical removal elements in a first GUI and a second GUI for only the latest reply in the communication thread that does not include at least one digital indicator and may simultaneously remove or delete the removable indicators and graphical removal elements in the first GUI and the second GUI associated with any previous replies that do not contain any other digital indicator. For example, server 107 may be configured to monitor communication thread 310 because the toggle and digital flag are set to active, and based on (e.g., in response to, using information derived from) detecting new reply 304B, removing the removal digital indicators and graphical removal elements associated with reply 304A in first GUI 300B and a second GUI (e.g., GUI 400) and generating a digital indicator and graphical removal element associated with reply 304B in first GUI 300B and a second GUI (e.g., GUI 400) before detecting a single user interaction. Further, server 107 may automatically update a database or data structure associated with the user to remove reply 304A and to add reply 304B. In this way, only the newest reply that does not include a user identifier, user group identifier, or a predefined graphical icon is added to the particular user's database or data structure and corresponding marked items list displayed in a second graphical user interface.

In some embodiments, server 107 may set the digital flag to active for a communication thread for a particular user if the particular user started the communication thread. For example, based on (e.g., in response to, using information derived from) detecting that the particular user sent a message that started a communication thread, server 107 may automatically set the digital flag to active for the communication thread for the particular user.

In some embodiments, server 107 may set the digital flag to active for a communication thread for a particular user after detecting a reply including a user identifier. For example, if the digital flag for a communication thread is set to inactive, server 107 may set the digital flag to active based on (e.g., in response to, using information derived from) detecting a new message or reply in the communication thread including a user identifier (e.g., @user) or user group identifier (e.g., @user-group) associated with the particular user. Additionally or alternatively, in some embodiments, based on (e.g., in response to, using information derived from) detecting a message in a thread comprising a user identifier, server 107 may set a second digital flag to active. The second digital flag may be a digital indicator designated to automatically trigger generation of at least one removable indicator for the most recent reply in the communication thread and removal of all older removable indicators for each older reply. Further, the second digital flag may remain set even if the user has set the toggle and digital flag associated with the communication thread to inactive. For example, based on (e.g., in response to, using information derived from) to detecting a message in a communication thread including a user identifier (e.g., @user), server 107 may set a second digital flag that adds the most recent reply to the communication thread to the database or data structure associated with the particular user and remove any older messages of the communication thread.

FIGS. 4A-4B are an exemplary GUI 400A, 400B of a group-based communication system that displays a marked items list, consistent with disclosed embodiments. As depicted in FIG. 4A, second GUI 400A may include marked items list 420, comprising a number of second removable indicators and second graphical removal elements equal to the data (e.g., messages) stored in the database or data structure associated with the particular user associated with the device. For example, marked items list 420 may include message 402A.

In some embodiments, server 107 may be configured to detect a selection interaction with a second removable indicator in the second GUI. A selection interaction may refer to any user interaction (e.g., click action, touch action) that selects something. For example, a user may click a second removable indicator (e.g., message 402A) of marked items list 420. In some embodiments, server 107 may be configured to, based on (e.g., in response to, using information derived from) detecting a selection interaction with an element of marked items list 420, display the first GUI and the first removable indicator. For example, as depicted, server 107 may be configured to display, based on (e.g., in response to, using information derived from) detecting a selection interaction with message 402A in second GUI 400A, an updated GUI 400B. Further, updated GUI 400B includes the second GUI 400A and first GUI 300B. However, in some embodiments updated GUI 400B may only include the first GUI and first removable indicator associated with the selected second removable indicator. Further, in some embodiments, server 107 may be configured to display the communication thread containing the message associated with the selected element of the marked items list. Server 107 may be configured to display, based on (e.g., in response to, using information derived from) detecting a selection interaction in the second GUI, the first GUI and the associated first removable indicator, the second GUI and the selected second removable indicator, the associated communication thread, or any combination of the foregoing.

In some embodiments, server 107 may be configured to display a graphical emphasis associated with the first removable indicator. The graphical emphasis may include highlighting the message, bolding an outline of the message, or any other means of graphical emphasis. In some embodiments, the graphical emphasis may be temporary and may return to an original state without emphasis. Additionally or alternatively, the graphical emphasis may not change until server 107 detects a new interaction. For example, based on (e.g., in response to, using information derived from) detecting a new selection interaction, server 107 may remove the graphical emphasis from the removable indicator and add a graphical emphasis to the removable indicator associated with the new selection.

Figure 5:
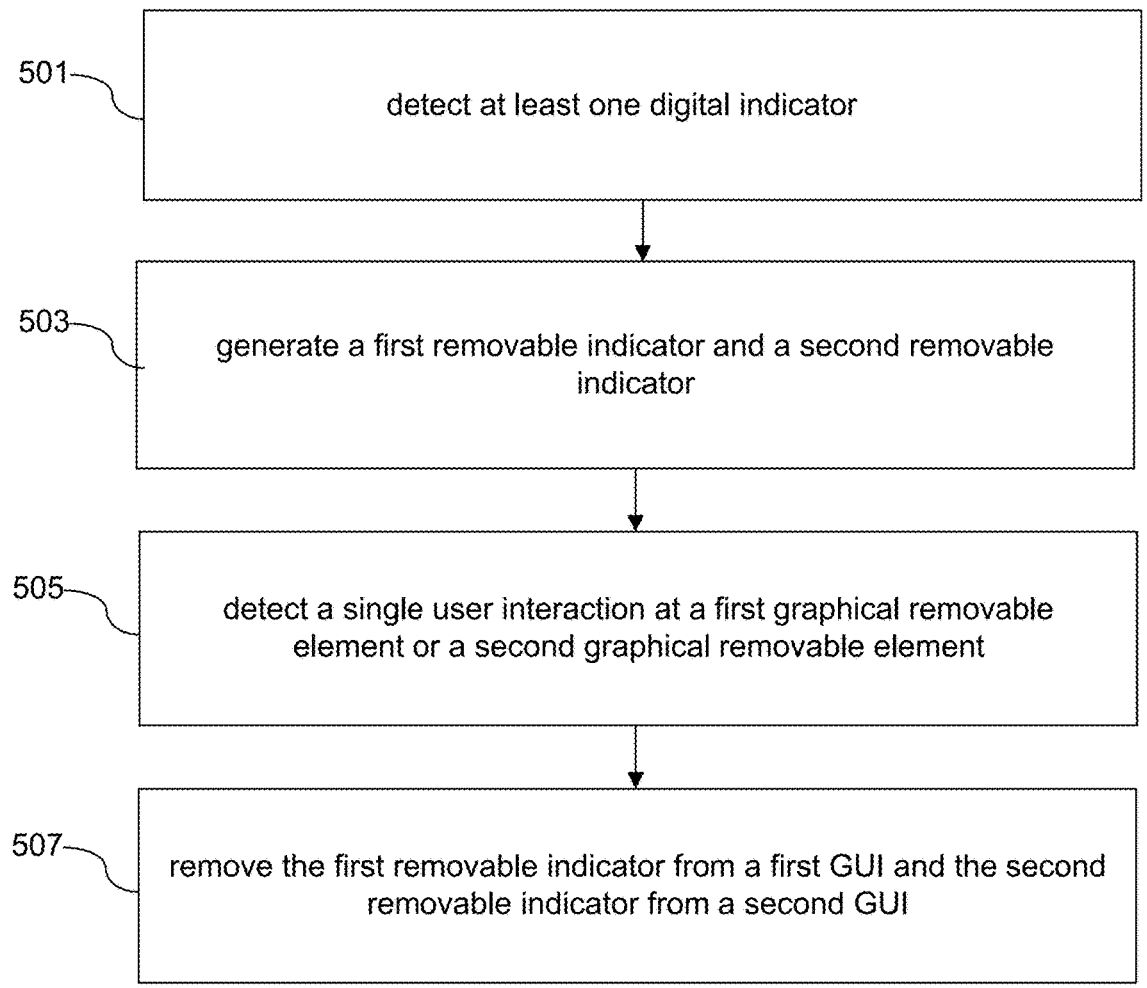
FIG. 5 shows an exemplary method for dynamically updating a group-based communication system, consistent with disclosed embodiments.

FIG. 5 is an exemplary block diagram for a method for dynamically updating a group-based communication system, consistent with disclosed embodiments. It is appreciated that the steps of the exemplary methods depicted in FIG. 5 would be impossible, or at least impractical, to effectively implement by a human user, especially when considering that these functionalities are implemented frequently (e.g., constantly, continually), simultaneously, and/or dynamically based on (e.g., in response to) received signals (e.g., messages) received from a multitude of sources (e.g., multiple users, communication channels, communication threads), which often have mismatching access credentials, and which may cause changes to multiple data elements (e.g., GUIs). In general, it may be understood that any/all steps of the exemplary methods of FIG. 5 may be performed or executed by at least one processor (e.g., at least one user device 101, at least one mobile device 103, at least one server 107, or any combination thereof), such as according to one or more instructions stored on a computer-readable medium (e.g., non-transitory computer-readable medium).

At step 501, the at least one processor (e.g., at least one user device 101, at least one mobile device 103, at least one server 107, or any combination thereof) may detect at least one digital indicator, consistent with disclosed embodiments. For example, the at least one processor may be configured to monitor each message in a group communication channel and detect if any message includes at least one digital indicator. In some embodiments, the at least one digital indicator may include one or more of: a particular text string identifier associated with a particular user, a predefined graphical icon, or a digital flag. The predefined graphical icon may include an emoji or emoticon, may be defined by a user of system 100, and/or may be stored in a memory of a device of system 100 (e.g., user device 101, mobile device 103, server 107). Detecting at least one digital indicator may include scanning or parsing API data or HTML data (e.g., without displaying the data) and/or comparing at least one text string within the group communication channel to one or more predetermined reference text strings to determine a match (e.g., exact character-for-character match, character match within a threshold tolerance amount).

At step 503, the at least one processor may generate a first removable indicator and a second removable indicator, consistent with disclosed embodiments. In some embodiments, the first removable indicator may be generated and configured to be displayed within a first GUI, and the second removable indicator may be generated and configured to be displayed within a second GUI, consistent with disclosed embodiments. The at least one processor may be configured to only generate one or more removable indicators associated with a message in a communication channel based on (e.g., in response to, using information derived from) determining that the message includes at least one digital indicator. For example, the at least one processor may be configured to highlight a message after determining that the message includes at least one digital indicator. In some embodiments, the second GUI may be configured to display information based on information from one or more communication channels (e.g., which may be associated with respective GUIs). Additionally, the second GUI may only be accessible to a particular one or first subset of user accounts (e.g., when logged in with particular user credentials) even though the one or more communication channels may be accessible to different second subsets (e.g., fully overlapping, partially overlapping, or non-overlapping subsets) of user accounts. The second GUI may be updated repeatedly and/or simultaneously based on interactions at different communication channels taken by different distinct (e.g., remote) devices. It is therefore appreciated that multiple devices accessing multiple different communication channels may be able to cause updates (e.g., generation of removable indicators) to a GUI to which none of them, or few of them, have access. It is also therefore appreciated that one device and/or user account may cause generation of a removable indicator that is only removable by another, different, device and/or user account. In some embodiments, the second GUI may be configured to display information based on information from only a single communication channel (e.g., which may be associated with respective GUIs). For example, multiple second GUIs may be present (e.g., stored, displayable), each of which may be associated with a single, separate, communication channel.

In some embodiments, a removable indicator may be associated with a particular message and/or digital indicator (e.g., detected at step 501). For example, a removable indicator may be graphically linked and/or digitally linked (e.g., through API or HTML information) to a particular message, such as by having a display location within a threshold display distance of the particular message. In some embodiments, a GUI (e.g., the first GUI, the second GUI) may be configured to allow a user to scroll or otherwise move between displaying different messages or other digital information while not moving one or more displayed removable indicators, which may be scrollable in a separate GUI pane (e.g., as depicted by the separate GUI panes in FIG. 4B, showing a "Marked Items List" GUI pane separate from other GUI panes). This may allow for more efficient management of removable information while still allowing for flexible display of other information (e.g., messages). In some embodiments, a removable indicator may be associated with a graphical removal element. In some embodiments, the first removable indicator and its associated graphical removal element are only viewable in a first GUI and the second removable indicator and its associated graphical removal element are only viewable in a second GUI.

At step 505, the at least one processor may detect a single user interaction at a first graphical removal element (e.g., within a first GUI) or a second graphical removal element (e.g., within a second GUI), consistent with disclosed embodiments. For example, the at least one processor may be configured to receive an input when a user performs a single user interaction (e.g., click action, touch action) at either the first graphical removal element in the first GUI or the second graphical removal element in the second GUI.

At step 507, the at least one processor may remove the first removable indicator from a first GUI and the second removable indicator from a second GUI, consistent with disclosed embodiments. For example, the at least one processor may be configured to remove, based on (e.g., in response to, using information derived from) in response to detecting a single user interaction at either the first graphical removal element in a first GUI or the second graphical removal element in the second GUI, the first removable indicator from the first GUI and the second removable indicator from the second GUI. Further, the at least one processor may be configured to also remove the first graphical removal element from the first GUI and the second graphical removal element from the second GUI. Additionally or alternatively, in some embodiments, the at least one processor may be configured to set a digital flag associated with a message or thread to inactive based on (e.g., in response to, using information derived from) detecting a single user interaction at either the first graphical removal element in a first GUI or a second graphical removal element in a second GUI. In some embodiments, the at least one processor may be configured to cause display of the first GUI and the second GUI together (e.g., simultaneously on a same display) and/or separately (e.g., not simultaneously on a same display, while allowing for transition between the GUIs based on at least one user interaction).

In some embodiments, the at least one processor may be configured to remove a removal element only based a particular type of user interaction (e.g., a subset of possible user interactions). For example, the at least one processor may be configured to remove a removal element only in response to a tap-and-hold (e.g., long press) interaction, but not in response to a swipe action, tap action, or click action. As another example, the at least one processor may be configured to remove a removal element only in response to a click or tap action but not in response to a tap-and-hold interaction. This may provide the technical benefit of preventing unintentional deletion of or changes to interface and/or API data.

In some embodiments, the first GUI may be part of a group communication channel and accessible to multiple devices associated with multiple user accounts (e.g., associated with separate user login credentials). Additionally, the second GUI may not be part of any group communication channel and may only be accessible to a device logged into an application (or other software program) with a particular set of user credentials. In some embodiments, when a removable indicator is added and/or removed from a GUI, corresponding interface update information (e.g., at least one API call) may be transmitted to at least one other device, which may prompt addition and/or removal there as well. For example, an interaction with the first GUI at one first device (e.g. a mobile device 103) logged into a first user account may cause an update to a second GUI at a second device logged into a second user account, though the first GUI may be accessible to both the first and second devices, but the second GUI may only be accessible to the second device. It is therefore appreciated that one device may be able update information of a particular GUI without having access to (e.g., the ability to display) the particular GUI.

In some embodiments, a step may be performed by one device and repeated by another device and/or a step may be performed by one device and resulting information (e.g., updated GUI information) may be transmitted to another device, such as for data replication or maintenance. For example, a mobile device 103 with an inactive connection to a network may remove a removable indicator from a GUI, and may automatically transmit instructions for a corresponding removal of GUI information from a remote device (e.g., server 107) when a network connection is reestablished. Unless explicitly specified otherwise, any feature described with respect to a communication channel or group communication channel may be equally applied to a communication thread.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. As used herein, unless specifically stated otherwise, being "based on" may include being dependent on, being interdependent with, being associated with, being defined at least in part by, being derived from, being influenced by, or being responsive to. As used herein, unless specifically stated otherwise, "user" may refer to an individual, a particular user account (e.g., associated with a digital application), a particular application session, a particular device, a particular system, or any combination thereof. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

The term "processor," as used herein, refers to one or more processors. The disclosed systems may be implemented in part or in full on various computers, electronic devices, computer-readable media (such as CDs, DVDs, flash drives, hard drives, or other storage), or other electronic devices or storage devices. The methods and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). While disclosed processes include particular process flows, alternative flows or orders are also possible in alternative embodiments.

Computer programs based on the written description and disclosed methods are within the skill of a software developer. The various functions, scripts, programs, or modules may be created using any of the techniques known to one skilled in the art or may be designed in connection with existing software. For example, programs, scripts, functions, program sections or program modules may be designed in or by means of languages, including.Net Framework, .Net Compact Framework (and related languages, such as Visual Basic, C, etc.), Java, C++, Objective-C, HTML, HTML/AJAX combinations, XML, HTML with included Java applets, or other programming or scripting languages. One or more of such software sections or modules may be integrated into a computer system, non-transitory computer readable media, or existing communications software. The programs, modules, or code may also be implemented or replicated as firmware or circuit logic.

The disclosed systems may be implemented in part or in full on various computers, electronic devices, computer-readable media (such as CDs, DVDs, flash drives, hard drives, or other storage), or other electronic devices or storage devices. The methods and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein. It is also intended that the sequence of steps shown in figures is only for illustrative purposes and is not intended to be limited to any particular sequence of steps. As such, those skilled in the art can appreciate that these steps can be performed in a different order while implementing the same method.

What is claimed is:

1. A system for dynamically updating a data structure of a group-based communication system, comprising:
    at least one processor; and
    at least one non-transitory computer-readable medium storing instructions that, when executed by the at least one processor, cause the at least one processor to perform operations comprising:
        detecting, within a message of a group communication channel represented within a first graphical user interface, a text string including at least one digital text indicator designated to automatically trigger generation of at least one removable indicator associated with the text string;
        generating, in response to the detecting of the at least one digital text indicator, a first removable indicator within the first graphical user interface, wherein the first graphical user interface includes a first graphical removal element associated with the first removable indicator;
        generating, in response to the detecting of the at least one digital text indicator, a second removable indicator within a second graphical user interface, wherein the second graphical user interface includes a second graphical removal element associated with the second removable indicator;
        detecting a single user interaction at the first graphical removal element or at the second graphical removal element, the single user interaction comprising at least one of a clicking action or a touch action; and
        in response to detecting the single user interaction, removing both the first removable indicator from the first graphical user interface and the second removable indicator from the second graphical user interface while not displaying the second graphical user interface on a display on which the first graphical user interface is displayed,
        wherein the first removable indicator and the second removable indicator are removed simultaneously, and
        wherein detecting the at least one digital indicator includes scanning API data without displaying the API data.

2. The system of claim 1, wherein the first removable indicator and the second removable indicator are removable in response only to either a first user interaction at the first graphical removal element or a second user interaction at the second graphical removal element.

3. The system of claim 1, wherein:
the group communication channel is configured to receive input from any one of a plurality of authorized user accounts; and
the first removable indicator, the first graphical removal element, the second removable indicator, the second graphical removal element are viewable to a particular one of the authorized user accounts and not any other authorized user account.

4. The system of claim 3, wherein the at least one digital text indicator designated to automatically trigger generation of the at least one removable indicator comprises at least one of:
a particular text string in the group communication channel, the particular text string including an identifier associated with the particular one of the authorized user accounts;
a predefined graphical icon; or
a digital flag.

5. The system of claim 4, the operations further comprising:
setting the digital flag to active in response to a setting interaction within the first graphical user interface by the particular one of the authorized user accounts; and
setting the digital flag to inactive in response to a deactivation interaction within either the first graphical user interface or the second graphical user interface by the particular one of the authorized user accounts,
wherein the digital flag is associated with a particular group communication channel.

6. The system of claim 3, wherein
the first graphical user interface is viewable to any one of a plurality of authorized user accounts, and
the second graphical user interface is viewable to a particular one of the authorized user accounts and not any other of the authorized user accounts.

7. The system of claim 5, wherein the at least one digital text indicator designated to automatically trigger generation of the at least one removable indicator comprises a text string in the group communication channel, wherein the text string is a reply to an input from any one of the authorized user accounts while the digital flag is active.

8. The system of claim 5, wherein:
the at least one digital text indicator is a first digital text indicator designated to automatically trigger generation of a first removable indicator; and
the operations further comprise:
after detecting the first digital text indicator, detecting, within the group communication channel, a second digital text indicator designated to automatically trigger generation of a second removable indicator; and
before detecting a single user interaction:
removing the first removable indicator; and
generating the second removable indicator.

9. The system of claim 1, the operations further comprising:
detecting a selection interaction with the second removable indicator;
in response to detecting the selection interaction with the second removable indicator, displaying the first graphical user interface with the first removable indicator; and
displaying a graphical emphasis associated with the first removable indicator.

10. The system of claim 1, wherein the at least one digital text indicator comprises at least one of an HTML element or API call information.

11. The system of claim 1, wherein detecting the text string within the group communication channel comprises comparing the text string to one or more predetermined reference text strings.

12. The system of claim 1, wherein the text string is generated by a first user account and the first removable indicator and the second removable indicator are removable only by a second user account.

13. The system of claim 1, wherein the first removable indicator is digitally or graphically linked to the message.

14. A computer-implemented method for dynamically updating a data structure of a group-based communication system, comprising:
detecting, within a message of a group communication channel represented within a first graphical user interface, a text string including at least one digital text indicator designated to automatically trigger generation of at least one removable indicator associated with the text string;
generating, in response to the detecting of the at least one digital text indicator, a first removable indicator within the first graphical user interface, wherein the first graphical user interface includes a first graphical removal element associated with the first removable indicator;
generating, in response to the detecting of the at least one digital text indicator, a second removable indicator within a second graphical user interface, wherein the second graphical user interface includes a second graphical removal element associated with the second removable indicator;
detecting a single user interaction at the first graphical removal element or at the second graphical removal element, the single user interaction comprising at least one of a clicking action or a touch action; and
in response to detecting the single user interaction, removing both the first removable indicator from the first graphical user interface and the second removable indicator from the second graphical user interface while not displaying the second graphical user interface on a display on which the first graphical user interface is displayed,
wherein the first removable indicator and the second removable indicator are removed simultaneously, and
wherein detecting the at least one digital indicator includes scanning API data without displaying the API data.

15. The method of claim 14, wherein the first removable indicator and the second removable indicator are only removable in response to either a first user interaction at the first graphical removal element or a second user interaction at the second graphical removal element.

16. The method of claim 14, wherein:
the group communication channel is configured to receive input from any one of a plurality of authorized user accounts; and
the first removable indicator, the first graphical removal element, the second removable indicator, the second graphical removal element are viewable to a particular one of the authorized user accounts and not any other authorized user account.

17. The method of claim 16, wherein the at least one digital text indicator designated to automatically trigger generation of the at least one removable indicator comprises at least one of:

a particular text string in the group communication channel, the particular text string including an identifier associated with the particular one of the authorized user accounts;

a predefined graphical icon; or a digital flag.

18. The method of claim 17, further comprising:

setting the digital flag to active in response to a setting interaction within the first graphical user interface by the particular one of the authorized user accounts; and setting the digital flag to inactive in response to a deactivation interaction within either the first graphical user interface or the second graphical user interface by the particular one of the authorized user accounts, wherein the digital flag is associated with a particular group communication channel.

19. The method of claim 18, wherein the at least one digital text indicator designated to automatically trigger generation of the at least one removable indicator comprises a text string in the group communication channel, wherein the text string is a reply to an input from any one of the authorized user accounts while the digital flag is active.

20. The method of claim 18, wherein:

the at least one digital text indicator is a first digital text indicator designated to automatically trigger generation of a first removable indicator; and the method further comprises:

after detecting the first digital text indicator, detecting, within the group communication channel, a second digital text indicator designated to automatically trigger generation of a second removable indicator; and before detecting a single user interaction:

removing the first removable indicator; and generating the second removable indicator.

21. The method of claim 14, further comprising:

detecting a selection interaction with the second removable indicator;

in response to detecting the selection interaction with the second removable indicator, displaying the first graphical user interface with the first removable indicator; and displaying a graphical emphasis associated with the first removable indicator.

22. The method of claim 14, wherein the at least one digital text indicator comprises at least one of an HTML element or API call information.

* * * * *